US 6,563,784 B2

(12) United States Patent
Han et al.

(10) Patent No.: US 6,563,784 B2
(45) Date of Patent: May 13, 2003

(54) MULTIPLE OPTICAL-RECORDING APPARATUS USING SOLID IMMERSION LENS

(75) Inventors: Gee Pyeong Han, Taejon (KR); Kyoung Ik Cho, Taejon (KR); Mun Cheol Paek, Taejon (KR); Yeung Joon Sohn, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 2 days.

(21) Appl. No.: 09/769,069

(22) Filed: Jan. 24, 2001

(65) Prior Publication Data

US 2002/0167893 A1 Nov. 14, 2002

(30) Foreign Application Priority Data

Jan. 27, 2000 (KR) .......................................... 2000-3869

(51) Int. Cl.[7] ........................... G11B 7/00; G11B 15/64; G11B 17/32
(52) U.S. Cl. .......................................... 369/300; 369/95
(58) Field of Search ...................... 369/300, 95, 13.33, 369/124.03, 112.24, 112.27

(56) References Cited

U.S. PATENT DOCUMENTS

| 4,301,527 | A | * | 11/1981 | Tsunoda et al. | .......... | 369/44.38 |
| 4,924,079 | A | * | 5/1990 | Opheij et al. | .............. | 250/201.5 |
| 4,969,137 | A | * | 11/1990 | Sugiyama et al. | ........ | 369/44.11 |
| 5,854,780 | A | * | 12/1998 | Opheij et al. | ............. | 369/44.23 |
| 5,881,042 | A | | 3/1999 | Knight | .......................... | 369/99 |
| 5,905,708 | A | * | 5/1999 | Richter | ................... | 369/112.21 |
| 6,341,106 | B1 | * | 1/2002 | Nakanishi et al. | ........ | 369/44.28 |

OTHER PUBLICATIONS

Suzuki et al., "Solid Immersion Lens Near Field Optical Approach For High Density Optical Recording," *IEEE Transactions on Magnetics* 34(2): 399–403, Mar. 1998.
Terris et al., "Optical Data Storage Using A Solid Immersion Lens," *Optoelectronics–Devices and Technologies* 10(3):303–310, Sep. 1995.

\* cited by examiner

*Primary Examiner*—Brian E. Miller
*Assistant Examiner*—Julie Anne Watko
(74) *Attorney, Agent, or Firm*—Seed IP Law Group PLLC

(57) ABSTRACT

The present invention relates to an optical data recording device using SIL (Solid Immersion Lens) in order to store information with high capacity, and more particularly to the multiple optical-recording apparatus capable of doing multiple information storage and play by forming multiple focus within the SIL. The present invention utilizes the optical technology by multiple source in order to overcome the limit of improving the recording speed and transfer rate due to the mechanical transfer and access, the flying head technology, which was proposed to increase the transfer rate and recording access speed in the near-field recording technology. The present invention can increase the recording speed and transfer rate using optical technology transcending the limit of mechanical transfer and access according to the number of the optical sources and focuses by recording and playing several pits simultaneously after forming multiple optical focus by multiple sources on the recording medium.

7 Claims, 4 Drawing Sheets

MULTIPLE OPTICAL-RECORDING APPARATUS USING SOLID IMMERSION LENS

TECHNICAL FIELD

The present invention relates to an optical data recording device using SIL (Solid Immersion Lens) in order to store information with high capacity, and more particularly to the multiple optical-recording apparatus capable of storing multiple information and playing by forming multiple focus within the SIL.

BACKGROUND OF THE INVENTION

The present invention relates to multiple optical-recording apparatus, which speeds up multiple information recording speed and transfer rate by forming multiple focus in the optical information storage device adopting near-field recording technology using SIL (Solid Immersion Lens) in order to overcome the diffraction limit of light.

The device storing information by focusing laser beam on a spot of the recording medium which is having the characteristics of magneto-optic or phase shift have been developed toward decreasing access time and increasing transfer rate and information recording density.

Although the size of the optical spot which is focused on the recording medium should be decreased, due to the diffraction limit of the light it can not be decreased below the constant size in the given wavelength.

There are DVD (Digital Versatile Disk) and near-filed recording technologies for increasing storage density and overcoming the limit.

The DVD technology is what changing the focal length of the focusing light in order to make several layers' mediums to be formed in the recording medium and the focusing light to be focused on each layer. However the DVD technology could not increase the recording density fundamentally, and also the transfer rate was not improved so obviously.

Meanwhile, in the near-field optical recording technology largely there are aperture and SIL technologies.

The aperture technology is that the optical energy distribution in the aperture is transferred to the recording medium without the influence of the diffraction as large as the size of the aperture by penetrating the light into the aperture after approaching the distance between the aperture and the recording medium to below several tens of nano-meter. While the optical fiber is used as the aperture and the light is transferred by making aperture of below several tens of nano-meter in the sharp end of the optical fiber which is coated with metal film of the optical fiber.

However, this technology has a disadvantage that the optical intensity passing through the aperture is too little to obtain the optical energy needed for real recording.

The SIL technology utilizes the principle that when the light is focused into the medium with high refractive index the wavelength is decreased and the refraction angle is increased and then the light is focused within the hemi-spherical SIL medium and the size of the focusing spot is decreased below the diffraction limit.

By utilizing the principle, the SIL technology makes the flat bottom plane of the SIL to be nearly approached to the recording medium and is implemented the light to be focused into the plane within the SIL medium. Herein, due to the high refractive index of the SIL medium, the focusing light forms the spot which is below the diffraction limit by the short wavelength and high numerical aperture. And the information is recorded through the transfer on the recording medium which is nearly approached without the influence of the energy diffraction of the spot.

By utilizing these methods, in order to do faster access and transfer, the technology mounting on the flying head which is adopted in the existing hard disk has been proposed and researched.

However, while the access time was considerably increased, there is limit in speeding up the recording speed and transfer rate. The reason is that as the flying head technology is the mechanical transfer and access fundamentally, there is the limit caused by the mechanical movement.

SUMMARY OF THE INVENTION

It is preferable that a multiple optical-recording apparatus, which is speeding up the recording speed and transfer rate by forming the multiple focus, comprise an optical source means consisting of two or more diverging points, an optical detecting means consisting of optical detecting devices for detecting two or more converging lights, an optical means for recording the information into the optical recording medium and reading out by forming two or more focuses, an optical beam splitting means for splitting the light converging into said optical detecting means and the light diverging from said optical source means, and an optical inducing means for inducing the light to said optical means from said optical source means and then for inducing the light to said optical detecting means from said optical means.

It is preferable that the multiple optical-recording apparatus is set up in the exterior and forms two or more diverging points in the interior of said optical means after inducing the light from the optical source.

It is preferable that the optical source means is composed of two or more semiconductor optical sources in which one light is diverged from one chip.

It is preferable that the optical inducing means for inducing light to the interior of said optical means from said optical source means is an optical fiber.

It is preferable that the optical inducing means for inducing light to the interior of said optical means from said optical source means is an optical waveguide.

It is preferable the optical means is set up in the interior of said optical means and is equipped with the optical source which is composed of two or more diverging lights and then forms two or more diverging points.

It is preferable that the optical detecting means is set up in the interior of said optical means.

It is preferable that the optical means comprise a reflection mirror for reflecting the points diverged from said optical source means, one or more refractive optical device for controlling the distance ratio between the points knotting focuses and the distance between the reflected points from said reflection mirror, and a refractive optical device which is composed of curved plane and flat plane making two or more focuses to be knotted.

It is preferable that the refractive optical device is the refractive optical device composed of curved plane or flat plane.

It is preferable that the optical means comprise one or more refractive optical device making the diverging points to the collimated light as the refractive optical device controlling the distance ratio and one or more refractive optical device focusing the collimated light.

It is preferable that the optical means makes two or more focuses to be knotted in the plane of the refractive optical device which is composed of curved plane and flat plane.

BRIEF DESCRIPTION OF THE DRAWINGS

The embodiments of the present invention will be explained with reference to the accompanying drawings, in which.

DETAILED DESCRIPTION OF THE INVENTION

In order to achieve the above described aims, the multiple optical-recording apparatus of the present invention is composed of an optical source means consisting of two or more diverging points; an optical detecting means consisting of optical detecting devices for detecting two or more converging lights; an optical means for recording the information into the optical recording medium and reading out by forming two or more focuses; an optical beam splitting means for splitting the light converging into said optical detecting means and the light diverging from said optical source means; and an optical inducing means for inducing the light to said optical means from said optical source means an then for inducing the light to said optical detecting means from said optical means.

Referring to accompanied drawings, other advantages and effects of the present invention can be more clearly understood through desirably executable examples.

Figure 1:
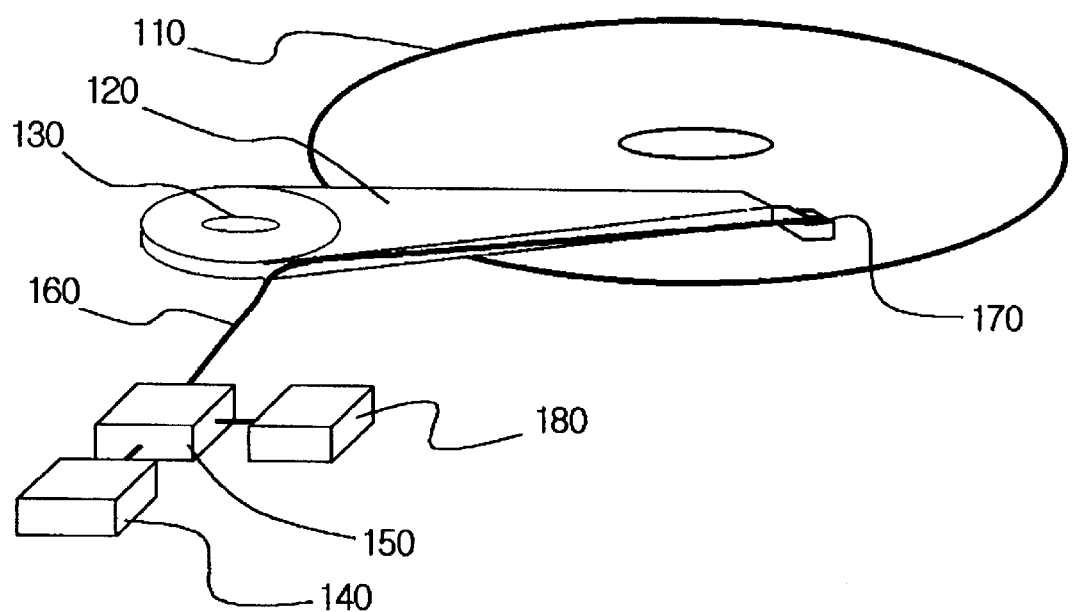
FIG. 1 is an overall drawing of a multiple optical-recording apparatus utilizing the SIL of the present invention.
Figure 2:
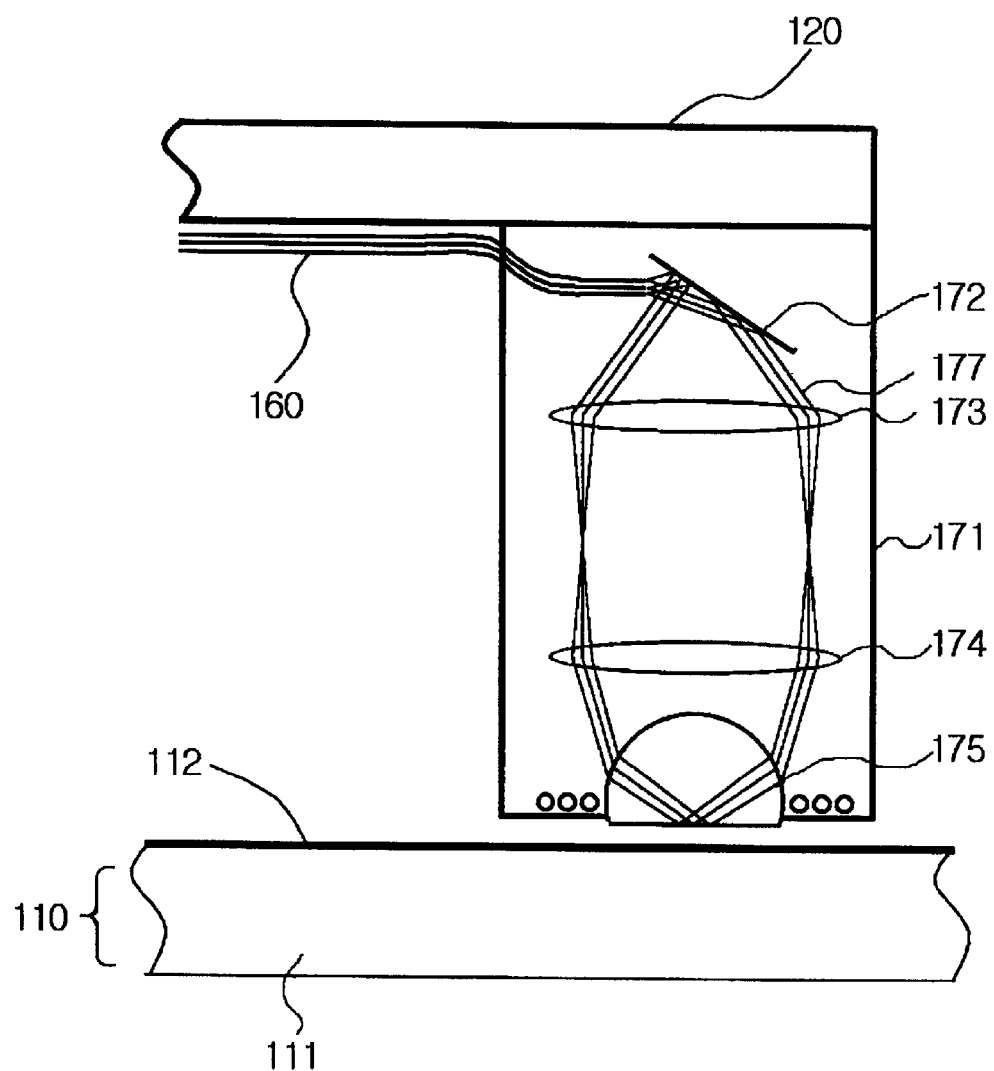
FIG. 2 is the detailed compositional drawing of flying head in the end of the suspension of the multiple optical-recording apparatus.

The multiple optical-recording apparatus utilizing the SIL of the present invention is composed of the optical probe recording device of flying head type like FIG. 1 and multiple source, optical waveguide, focusing unit, SIL, etc. like FIG. 2.

FIG. 1 is an overall drawing of a multiple optical-recording apparatus utilizing the SIL of the present invention.

FIG. 1 is composed of a multiple source 140 consisting of two or more diverging points; an optical detector 180 consisting of optical detecting devices for detecting two or more converging lights; an optical probe 170 for recording the information into the optical recording medium and reading out by forming two or more focuses; an optical beam splitter 150 for splitting the light converging into said optical detector 180 and the light diverging from said multiple source 140; and an optical waveguide 160 for waveguiding the light to said multiple source 140, beam splitter 150, optical probe 170 and optical detector 180.

Herein, 120 is a suspension and 130 is a rotating axis of the suspension. The suspension 120 moves said optical probe 170 which is sticking to the end of that to the specific position of the disk recording medium in which the information is recorded and played.

Hereafter the operation of the present invention implemented like this is described.

Like hard disk, the optical probe 170 in the end of the suspension 120 is nearly approached to the disk recording medium 110 and records information and plays while flying at certain height.

The procedure of the recording and play of the information is transferred to the optical probe 170 from the multiple source 140 after the light progressing through the optical beam splitter 150 and the optical waveguide 160 along the suspension 120.

The reflected light detects the signal after progressing to the optical detector 180 through the optical waveguide 160 and the optical beam splitter 150.

And the access of the information is performed while the suspension 120 rotating around the rotating axis 130.

In the case that the optical detector 180 and the multiple source 140 for storing multiple information are built in, the signal line transferring the electrical signal instead of the optical waveguide 160 is carried along the suspension 120.

And an optical fiber can be used instead of said optical waveguide 160.

In the present invention, the flying head is used as the optical probe 170.

FIG. 2 represents the detailed compositional drawing and composed of a flying head body 171 which is sticked to the end of the suspension 120; a reflection mirror 172 for reflecting the incident light through the optical waveguide 160; lenses 173 and 174 for inducing and focusing the reflected light from said reflection mirror 172; and an SIL 175 for forming the focus of the light that had penetrated said lenses 173 and 174.

From the composition, the light produced from the multiple source 140 is induced to the flying head body 171 through the optical waveguide 160 and then is incident and focused to the bottom plane of the SIL 175 through the reflection mirror 172 and lenses 173 and 174. The focused light stores or plays the information by being recorded or reflected to the recording medium 112 of the disk 111 which is nearly approached.

And, said lenses 173 and 174 uses what made of curved plane or flat plane and controls the distance ratio between the diverging points and the points knotting focus. Said lens 173 is the refractive optical device making the diverging points to the collimated light and said lens 174 is the refractive optical device making the collimated light to be focused.

Figure 3:
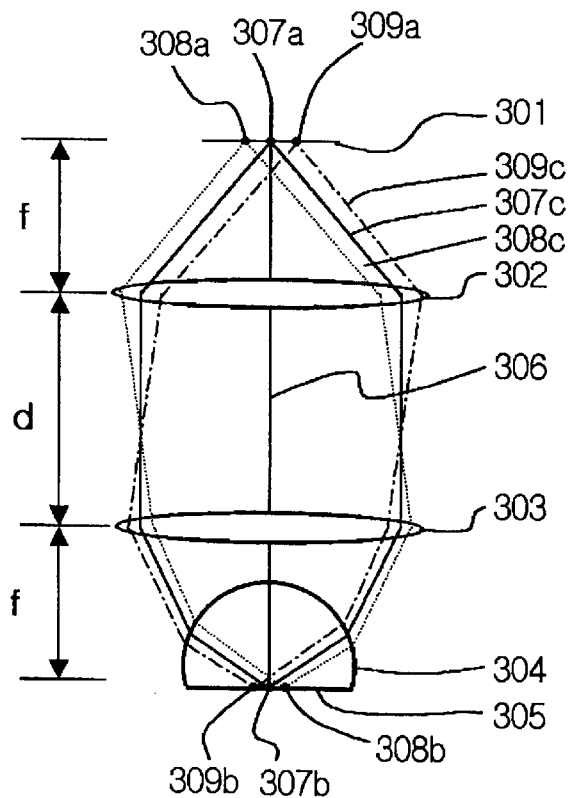
FIG. 3 is a drawing illustrating the principle of the multiple recording utilizing SIL.

FIG. 3 illustrates the principle of the multiple recording utilizing SIL.

The diverged light from an optical source plane 301 forms focus on a focal plane 305, bottom plane, after being focused into an SIL 304 through lenses 302 and 303. An optical source 307a starting at an optical axis 306 of the optical plane 301 forms focus 307b on the focal plane 305 of the SIL 304 along an optical path 307c, an optical source 308a deviating the optical axis 306 forms a focus 308b located in the opposite side around the optical axis along the optical path 308c due to the inclination of the chief ray, and like this the other optical source 309a forms a focus 309b along the optical path 309c.

The lenses 302 and 303 inducing the light separated as long as distance d and the distance should be determined by the number of the aperture and focal length.

The distance among focuses 307b, 308b and 309b is controlled by the focal lengths f1 and f2 of the lenses 302 and 303. As the distance among focuses 307b, 308b and 309b should be equal to the track period p, the distance between pit 401 arrays described in FIG. 4, p can be represented as the following Equation 1 by the period f1 and f2 of the optical sources, the distance among the optical sources 307a, 308a and 309a.

$$p = \text{focus period} = \frac{f1}{f2} \times \text{optical source period} \quad (1)$$

Figure 4:
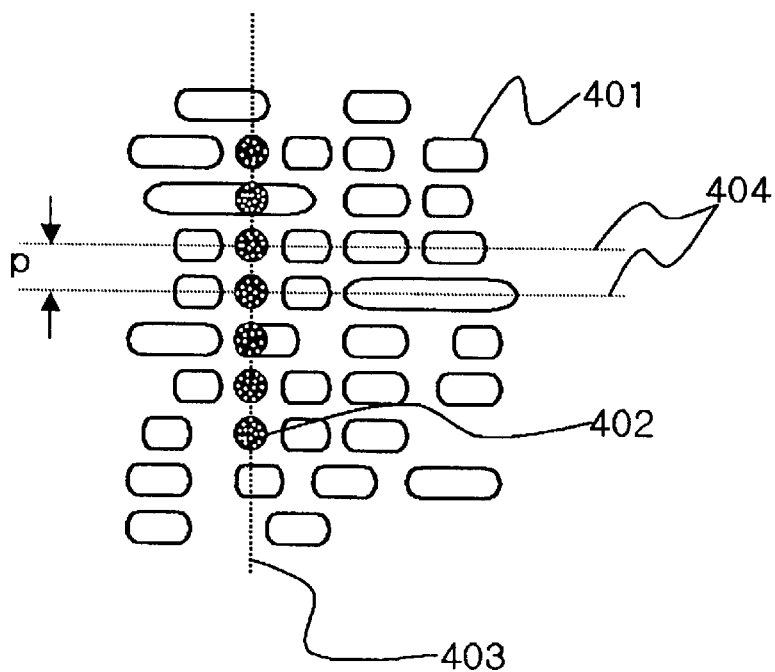
FIG. 4 is a drawing illustrating the multi focused state which is seen in the perpendicular direction to the disk plane.

Also, in FIG. 4, each light reflected from the focal plane 305 returns to the same optical source. Therefore, the reflected signal can be detected in the path of the same optical source.

FIG. 4 illustrates the focused state which is seen in the perpendicular direction to the disk 101 plane. The focus focused by multiple focusing on the pit 401 is arrayed along the multiple focus line 403 and forms the array of the focal spot 402. And the array of the focal spot 402 is arrayed in the perpendicular direction to the pit 401 array. As the optical spot period of the array of the focal spot 402 is made to be correspond with the pit period of the pit 401 array, several pits can be recorded and played simultaneously.

Figure 5A:
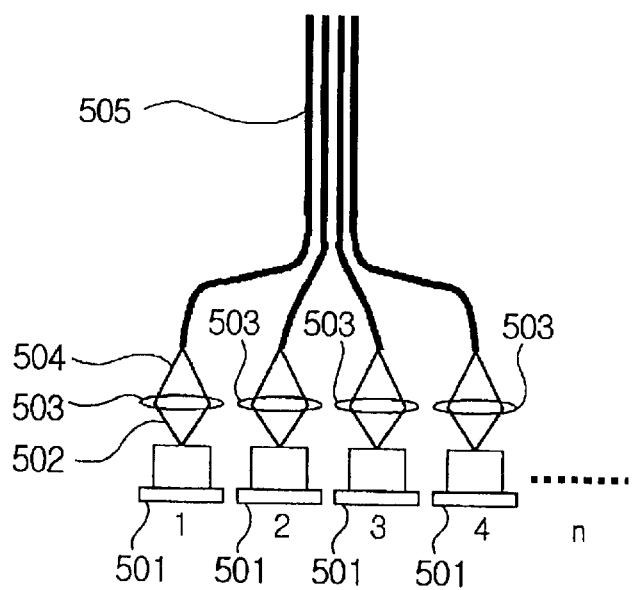
FIG. 5a is a drawing illustrating multiple source utilizing several semiconductor lasers.
Figure 5B:
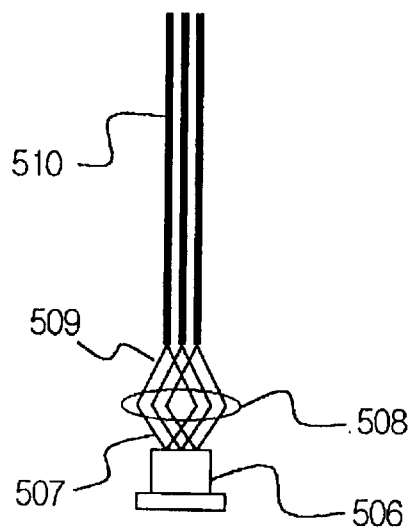
FIG. 5b is a drawing illustrating multiple source utilizing array semiconductor laser.

FIG. 5a and FIG. 5b are detailed compositional drawing of the multiple source 140 which can record and play several pits on the disk plane.

FIG. 5a illustrates the technology utilizing several semiconductor lasers and FIG. 5b illustrates the technology utilizing array semiconductor laser.

The multiple source of FIG. 5a is composed of n semiconductor lasers 501, a focusing lens 503 and an optical waveguide 505 and the light produced from the n semiconductor lasers 501 is transferred to the optical probe 170 through the focusing lenses 503. The recording light controls the semiconductor lasers 501 by modulating electrically.

In FIG. 5b, the multiple light produced from the array semiconductor laser 506 is incident to the optical waveguide 510 by a focusing lens 508 and then transferred to the optical probe 170.

As described above, the present invention can double the recording speed and transfer rate according to the number of focuses by the multiple focus technology, which is multiply recording and storing the information by forming the multiple focus on the bottom plane of the SIL using the multiple source and the optical waveguide, and can control the focus period according to the track period by utilizing the focal length of the focusing lens in the optical information storage apparatus adopting near approach technology utilizing SIL.

Although, the present invention was described on the basis of preferably executable examples, these executable examples do not limit the present invention but exemplify. Also, it will be appreciated by those skilled in the art that changes and variations in the embodiments herein can be made without departing from the spirit and scope of the present invention as defined by the following claims.

What is claimed is:

1. A multiple optical-recording apparatus for recording information on an optical recording medium with increased recording speed and transfer rate by utilizing multiple focuses, comprising:

an optical source means consisting of a plurality of light emitting elements from each of which a light beam is emitted;

an optical means for recording information onto the optical recording medium by focusing a plurality of the light beams provided from said optical source means into a plurality of focal points corresponding to the plurality of light emitting elements of said optical source means and for reading information from the optical recording medium by receiving a plurality of light beams reflected by the optical recording medium;

an optical inducing means for inducing the plurality of light beams emitted by said optical source means to said optical means so that each of the light beam is focused on the corresponding focal point by said optical means and for inducing a plurality of light beams reflected from said optical recoding medium into said optical means toward the optical source means;

an optical beam splitting means optically connected to said optical inducing means for splitting the plurality of light beams traveling from said optical source means and from said optical means; and an optical detecting means having a plurality of optical detecting elements corresponding to the plurality of light emitting elements of said optical source means for respectively detecting the plurality of light beams split by said optical beam splitting means, wherein said optical means comprises:

a reflection mirror for reflecting a plurality of light beams emitted by the plurality of light emitting elements of said optical source means;

a plurality of refractive optical elements for controlling a ratio of a distance between the focuses formed by said optical means to a distance between the reflection points of said reflection mirror; and a solid immersion lens (SIL) for forming a plurality of focuses respectively corresponding to the plurality of light beams reflected by the reflection mirror.

2. The multiple optical-recording apparatus according to claim 1, wherein each of the light emitting element of the optical source means is composed of a light emitting semiconductor device.

3. The multiple optical-recording apparatus according to claim 2, wherein the light emitting semiconductor device is disposed on a single chip.

4. The multiple optical-recording apparatus according to claim 3, wherein said optical inducing means for inducing light to said optical means from said optical source means includes an optical fiber.

5. The multiple optical-recording apparatus according to claim 3, wherein said optical inducing means for inducing light to said optical means from said optical source means includes an optical wave-guide.

6. The multiple optical-recording apparatus according to claim 1, wherein said optical means comprises one or more refractive optical devices for making the light beam emitted from each of the light emitting element to a collimated light beam and one or more refractive optical devices for focusing the collimated light beam.

7. The multiple optical-recording apparatus according to claim 1, wherein said optical means forms a plurality of focuses in a plane surface of the solid immersion lens (SIL).

* * * * *